United States Patent [19]

Franke

[11] 4,176,950
[45] Dec. 4, 1979

[54] LASER DOPPLER VELOCITY SIMULATOR

[75] Inventor: John M. Franke, Norfolk, Va.

[73] Assignee: The United States of America as represented by the United States National Aeronautics and Space Administration, Washington, D.C.

[21] Appl. No.: 929,083

[22] Filed: Jul. 28, 1978

[51] Int. Cl.² .......................... G01P 3.36; G01J 1/02
[52] U.S. Cl. .................................. 356/28; 332/7.51; 350/359; 356/243
[58] Field of Search .......................... 356/5, 28, 243; 350/6.2, 6.4, 266, 267, 273, 359; 332/7.51

[56] References Cited

U.S. PATENT DOCUMENTS

| 3,561,870 | 2/1971 | Redpath | 356/28 |
| 3,687,517 | 8/1972 | Brun | 356/28 |
| 3,791,736 | 2/1974 | Newburg | 356/28 |
| 3,962,576 | 6/1976 | Kuhl et al. | 332/7.51 |
| 4,123,166 | 10/1978 | Botcherby et al. | 356/28 |

Primary Examiner—S. C. Buczinski
Attorney, Agent, or Firm—Wallace J. Nelson; John R. Manning; Howard J. Osborn

[57] ABSTRACT

A method and apparatus for inducing a Doppler frequency shift in a reference beam laser velocimeter light beam to simulate target velocity wherein the light beam is passed through a rotating refractive transparent block positioned between two reference points along the beam resulting in a continuous change in the light beam optical path length between the reference points according to a known function. The velocity indicated by the laser velocimeter is compared to the known simulated velocity function for velocimeter testing and calibration.

9 Claims, 3 Drawing Figures

LASER DOPPLER VELOCITY SIMULATOR

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to a laser doppler velocity simulator and in particular to a laser doppler velocity simulator in which a laser beam is passed through a rotating refractive transparent block whereby the beam optical path length is continuously changing thus inducing a doppler frequency shift in the laser beam.

A variety of anemometers are in use for measuring the magnitude of fluid low velocity in a wind tunnel. Among these are pitot tubes, hot wires, and reference beam laser velocimeters. The reference beam laser velocimeter measures the doppler frequency shift induced in a reference beam reflected from a moving target object, such as a dust particle or smoke particle suspended in a fluid stream. The magnitude of doppler shift is indicative of the velocity of the target object and the fluid. This device is especially useful where fine resolution is desired as in fluid boundary layers adjacent to model surfaces in wind tunnel tests.

In testing and evaluating methods for directional ambiguity removal for a reference beam laser velocimeters, a need arose for a velocity simulator to simulate motion in the direction of the illuminating beam and reversible in direction periodically. Furthermore, it was desired that the returned beam be collinear with the incident beam and that doppler shifts of 5 megahertz or more result. Several schemes including ground discs and speaker mounted mirrors were investigated but proved inadequate.

The present invention meets the above criteria and provides a new approach for testing and calibration of reference beam laser velocimeters by simulating the movement of a target object. A rotating glass block continuously changes the optical path length of the laser volocimeter reference beam thus inducing a doppler frequency shift therein. The magnitude of the frequency shift is a function of the known rate of change of the optical path length. The doppler frequency shift registered by the velocimeter is compared to the calculated true doppler frequency shift for calibration.

An object of the present invention is a method and apparatus to induce a doppler frequency shift of known magnitude in a laser light beam.

A further object of the invention is a method and apparatus to induce a doppler frequency shift in a reference beam laser velocimeter laser beam to simulate target velocity having a component in the direction of the beam and reversible in direction periodically.

A further object of the invention is a laser doppler velocimeter which yields the foregoing advantages and in which the return beam is collinear with the incident beam and which produces doppler shift of at least 5 megahertz.

Other objects and advantages of the present invention will be readily apparent from the following description and drawings which illustrate preferred embodiments of the present invention.

SUMMARY OF THE INVENTION

The present invention involves a method and apparatus for inducing a doppler frequency shift in a laser light beam by passing the laser light beam through a rotating refractive transparent block positioned between two reference points along the beam whereby the total optical path length between the two reference points is continuously changing.

When the present invention is used in conjunction with a reference beam laser velocimeter to simulate velocity, a flat mirror or retro reflector is positioned to reflect the laser light beam from the velocimeter, having passed through the rotating refractive transparent block, back to the velocimeter return beam receiver.

DESCRIPTION OF THE PREFERRED EMBODIMENT

Figure 1:
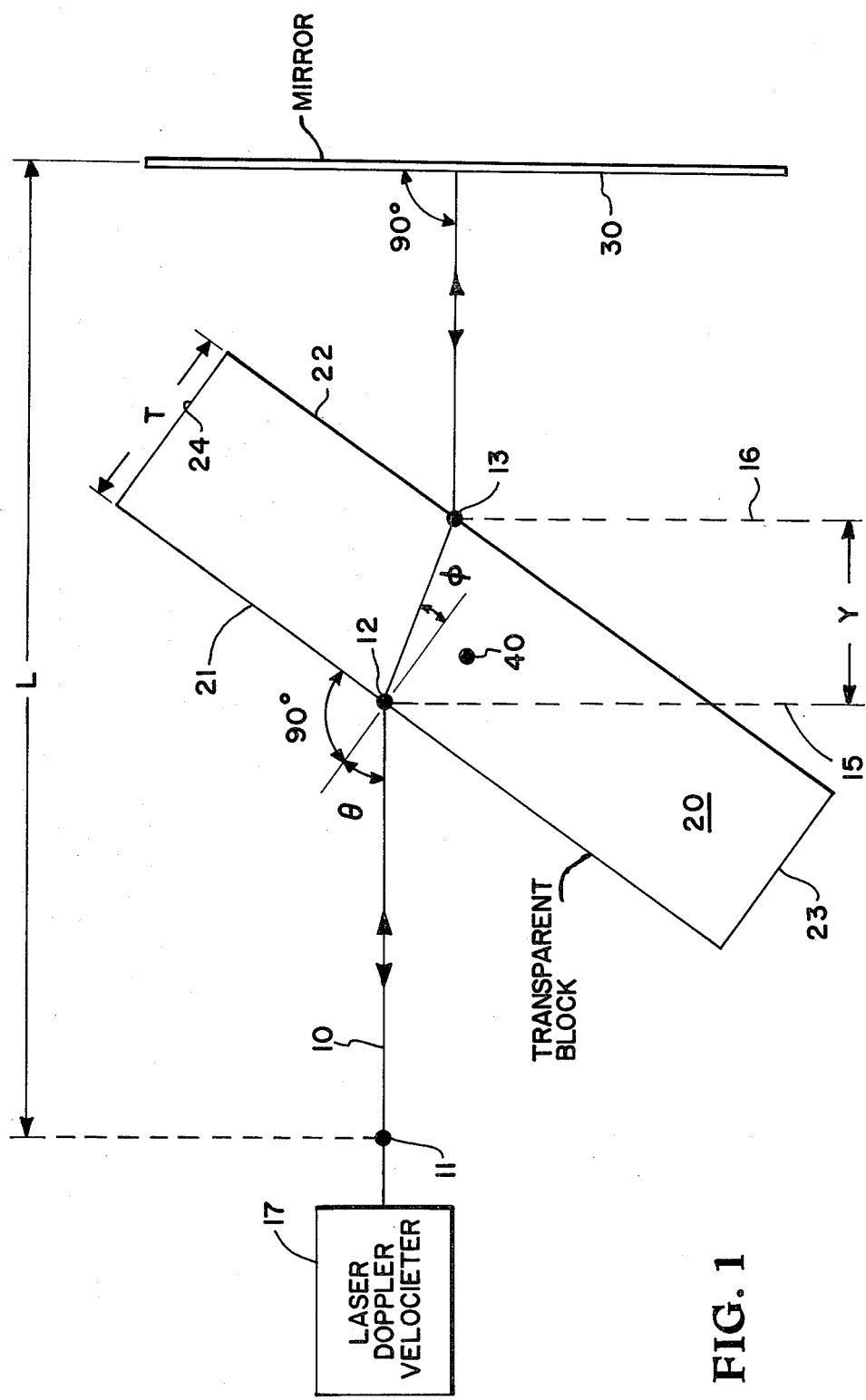
FIG. 1 is a plan view of a laser doppler velocity simulator according to the present invention.

Referring to FIG. 1, a plan view of the preferred embodiment of the present invention is shown. Transparent block 20 is of thickness T between flat mutually parallel faces 21 and 22. Block 20 is rotatable about an axis 40 which is parallel with faces 21 and 22 and in the preferred embodiment lies midway therebetween. Sides 23 and 24 of the preferred embodiment are flat, mutually parallel, perpendicular to faces 21 and 22, and parallel with and equidistant from axis 40.

The precise positioning of axis 40 midway between faces 21 and 22 and midway between sides 23 and 24 enables balanced rotation of block 20 about axis 40 but the precise positioning thereof is not critical for the operation of the invention.

Flat mirror 30 is positioned parallel with axis 40 and at sufficient distance to preclude interference with the rotation of block 20 about axis 40. Laser doppler velocimeter 17 is positioned such that the laser beam 10 emitted therefrom is aimed perpendicular to mirror 30 and to be incident upon block 20 approximately in the middle of face 21 when face 21 is parallel with and facing away from flat mirror 30.

The optical path of the laser beam 10 extends from reference point 11 through block 20 to mirror 30 where the beam is reflected back through block 20 and continuing back through point 11 to be received by the velocimeter 12. As block 20 rotates about axis 40 the length of path 10 is constantly changing resulting in a doppler frequency shift between the emitted beam at point 11 traveling to the right and the reflected return beam at point 11 traveling to the left.

The apparent velocity simulated by the invention equals the derivitive of the total optical path length function with respect to time, t, $d/dt(TOP)=v$. To determine this function for the embodiment of FIG. 1 the following parameters are defined.

L is the distance from point 11 to mirror 30 along a straight line perpendicular thereto.

Points 12 and 13 represent the intersection of optical path 10 and faces 21 and 22, respectively.

Y is the distance between planes 15 and 16 along a straight line perpendicular thereto. Planes 15 and 16 are mutually parallel with mirror 30 and pass through point 12 and 13 respectively.

T is the distance between faces 21 and 22 along a line perpendicular thereto.

$\theta$ is the angle of incidence of the laser beam in air with respect to the plane of face 21. Although face 21 is used for purposes of illustration in FIG. 1, when block 20 rotates sufficiently the laser beam will be incident on face 22.

$\phi$ is the angle of incidence of the laser beam in block 20.

N is the index of refraction of block 20. Z is the physical path length of the laser beam in block 20 and is represented by a straight line between points 12 and 13 in FIG. 1.

The optical path length in a medium equals the physical path length multiplied by the index of refraction relative to a vacuum. The index of refraction of air is approximately equal to unity. p Therefore, the optical path length in block 20 equals NZ. The total optical path length, TOP, from point 11 to mirror 30 in FIG. 1 is $$TOP = L - Y + NZ \quad (1)$$

From FIG. 1, $$Z = T/\cos \phi \quad (2)$$

and, $$Y = Z \cos(\theta - \phi) = Z(\cos \theta \cos \phi + \sin \theta \sin \phi) \quad (3)$$

The angles $\phi$ and $\theta$ are related by the expression $$\sin \phi = \sin \theta / N \quad (4)$$

$$\cos \phi = [1 - (\sin^2 \theta / N^2)]^{\frac{1}{2}} \quad (5)$$

Substituting equations (2), (3), (4) and (5) into equation (1) yields
ti $TOP = L - T \cos \theta - NT[1 - (\sin^2 \theta / N^2)]^{\frac{1}{2}} \quad (6)$ For rotation of block 20 at a constant angular frequency, w, $$\theta = wt \quad (7)$$

Substituting equation (7) into equation (6) and differentiating with respect to time, t, yields $$(d/dt)(TOP) = v = wT \sin(wt)[1 - \cos(wt)(N^2 - \sin^2(wt))^{-\frac{1}{2}}] \quad (8)$$

From equation (8) the rate of change in optical path length, the simulated velocity, is calculated and can be compared to the velocity indicated by the laser velocimeter 17 for testing and calibration thereof.

In the preferred embodiment shown in FIG. 1 the beam is reflected off mirror 30 to pass through block 20 a second time. Thus, equation (8), having been derived for a single pass through block 20, must be doubled to find the true rate of change of the optical path length.

In operation of the preferred embodiment of the invention, block 20 rotates about axis 40 at a constant angular frequency w. Laser doppler velocimeter 17 emits a light beam which passes through block 20, being refracted therein, and emerges to perpendicularly strike mirror 30 and be reflected therefrom to pass through block 20 a second time and to be received by laser doppler velocimeter 17.

The optical path length of the laser beam 10 is constantly changing as a result of passing through rotating block 20. A doppler frequency shift results which is indicative of the rate of change of path length.

For a typical reference beam laser velocimeter laser wavelength of 6328 angstroms, a block 20 having a thickness, T, of 1.0 inch must rotate at a minimum rate, w, of approximately 0.99 revolution per second to induce the minimum desired doppler shift of 5 megahertz. The magnitude of the product wT is decreased or increased to yield proportionately lesser or greater doppler shifts as desired.

Figure 2:
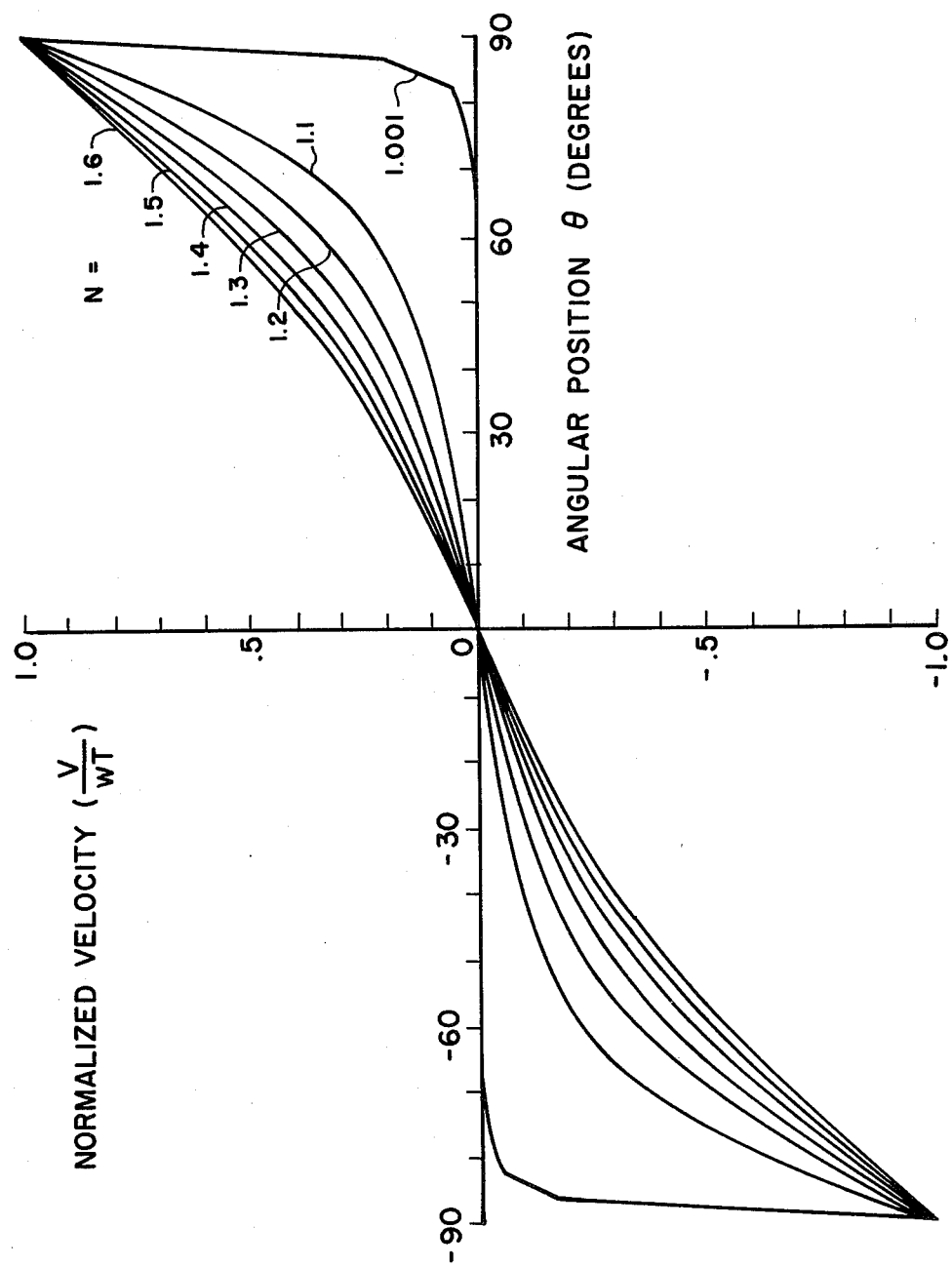
FIG. 2 is a graph of simulated velocity as a function of refractive index and angular position as obtained by the present invention; and, FIG. 3 is an elevational view similar to FIG. 1 showing the use of a retro reflector in the present invention.

Refer now to FIG. 2 where curves of simulated velocity normalized to the parameters wT are shown as a function of angular position, $\theta$, and the index of refraction, N, of the block material. The family of curves of FIG. 2 are calculated from equation (8) and illustrate the periodic and reversable characteristics of the velocity simulated by the preferred embodiment of the invention. Note that this characteristic becomes increasingly linear as the index of refraction, N, becomes large.

Figure 3:
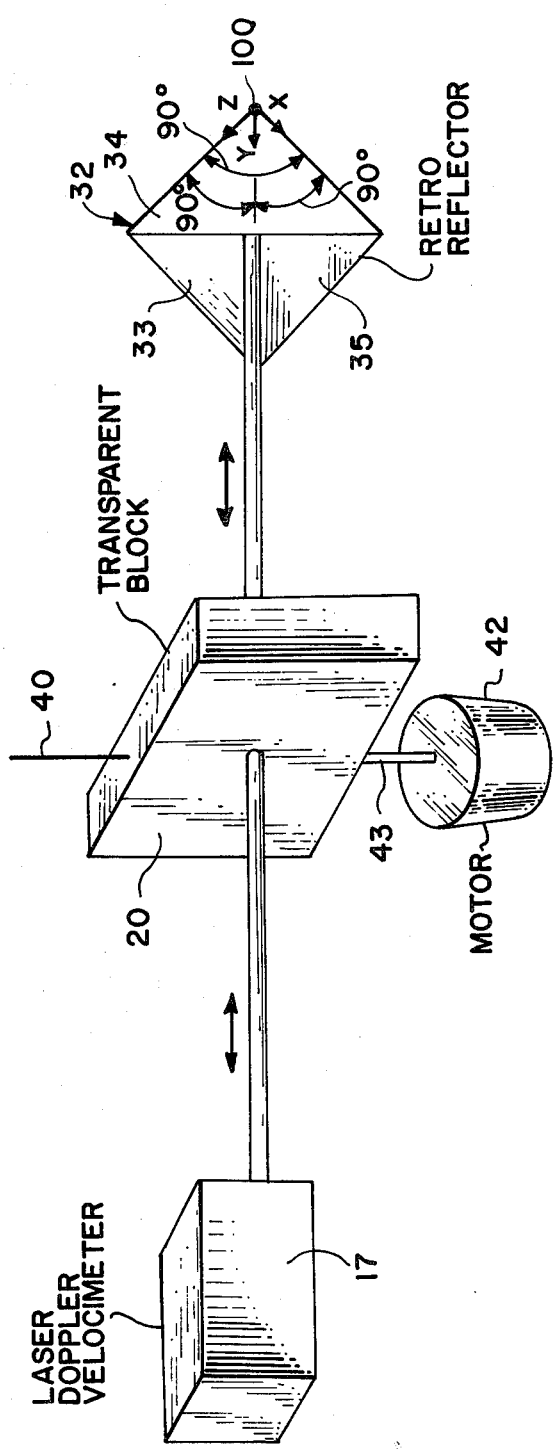

FIG. 3 shows an alternate embodiment of the present invention which utilizes a retro reflector mirror 32. The retro reflector 32 consists of three flat mirrors 33, 34, 35, each oriented perpendicular to the other two, to form a 3-D corner. The intersection of mirrors 35 and 34, 33 and 35, and 33 and 34, lie on the Cartesian coordinate axes x, y and z respectively with all mirrors coming together at the origin of the coordinate system, point 100.

The retro reflector 32 will reflect light beams on a path parallel with and of opposite direction to the beam incident path.

The retro reflector is the preferable reflecting means for use with wide beam lasers; the flat mirror reflector is preferable for use with narrow beam lasers.

Also shown in FIG. 3 is rotating mechanism 42 and shaft 43 for rotating block 20 on axis 40 of angular frequency w. Rotating mechanism 42 may be any conventional motor that provides a constant rotative motion to shaft 43 and connected block 20.

The above-described description and drawings are only illustrative of preferred embodiments which achieve the objects, features and advantages of the present invention, and it is not intended that the present invention be limited thereto. Any modifications of the present invention which come within the spirit and scope of the following claims are considered part of the present invention.

What is claimed as new and desired to be secured by Letters Patent of the United States is:

1. A method for inducing a doppler frequency shift in a laser light beam comprising the steps of:
   (a) providing a laser light beam from a first reference point to a second reference point;
   (b) providing a uniformly refractive transparent object positioned between said first reference point and said second reference point whereby laser light beam passes therethrough; and,
   (c) continuously rotating said refractive transparent object thereby continuously changing the optical path length of said laser light beam therethrough and between said first reference point and said second reference point.

2. A method for inducing a doppler frequency shift in a laser light beam comprising the steps of:
   (a) providing a uniformly refractive transparent block having a flat first face and a flat second face, said first face being parallel with said second face, said block being rotatable about an axis, said axis being parallel with and between said first face and said second face;
   (b) providing a flat mirror parallel to said axis and being a sufficient distance removed from said axis to allow said block to rotate freely about said axis;
   (c) providing a laser beam source being a sufficient distance removed from said axis to allow said block to rotate freely about said axis;
   (d) shining a laser beam from said laser beam source to pass through said block to perpendicularly strike said mirror to be reflected back through said block and to emerge from said block;
   (e) continuously rotating said block about said axis whereby the path length of said laser beam from said laser beam source through said block to said mirror and back through said block to said laser beam source is continuously changing to induce a doppler frequency shift in said laser beam.

3. A laser doppler velocity simulator for use with a reference beam velocimeter comprising:
   (a) a uniformly refractive transparent block having a flat first face and a flat second face, said first face being parallel with said second face, said block being rotatable about an axis, said axis being parallel with and between said first face and said second face;
   (b) rotating means for rotating said block about said axis to continuously change the optical path length of the velocimeter laser light beam passing through said block to induce a doppler frequency shift in the velocimeter light beam.

4. A laser doppler velocity simulator comprising a uniformly refractive transparent block and means to rotate said block to continuously change the optical path length of a laser light beam passing therethrough thereby inducing a doppler frequency shift in the laser light beam.

5. A laser doppler velocity simulator as in claim 3 wherein said block is glass.

6. A laser doppler velocity simulator as in claim 3 further comprising: reflection means for reflecting said laser light beam, having passed through said block toward the velocimeter.

7. A laser doppler velocity simulator as in claim 6 wherein said reflection means collinearly reflects said laser light beam back through said block to the velocimeter.

8. A laser doppler velocity simulator as in claim 6 wherein said reflection means comprises a flat mirror.

9. A laser doppler velocity simulator as in claim 6 wherein said reflection means comprises a retro reflector.

* * * * *